UNITED STATES PATENT OFFICE.

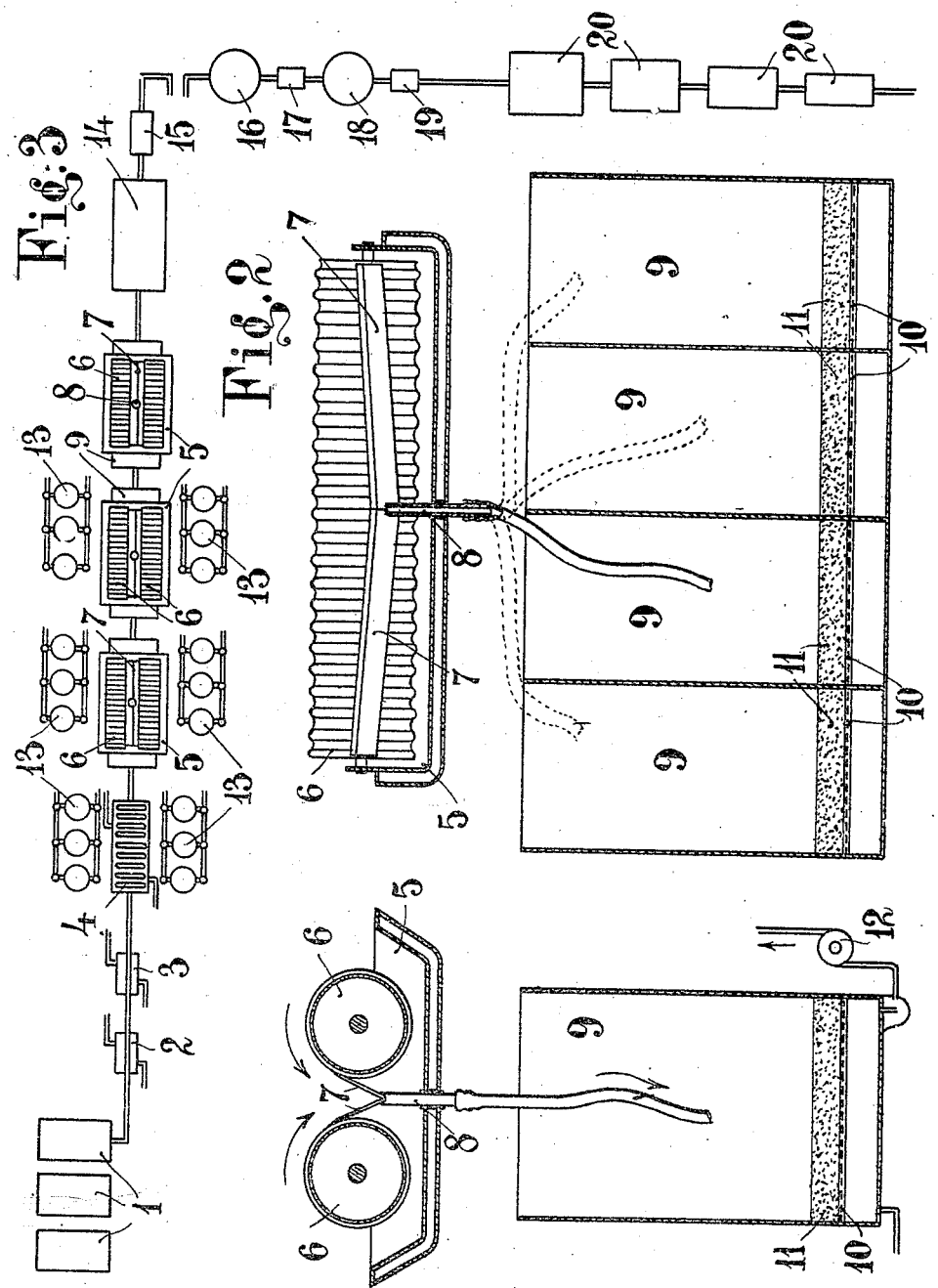

EUDO MONTI, OF TURIN, ITALY.

APPARATUS FOR CONCENTRATING SOLUTIONS.

1,065,829.  Specification of Letters Patent.  Patented June 24, 1913.

Application filed August 20, 1912. Serial No. 716,022.

*To all whom it may concern:*

Be it known that I, EUDO MONTI, a subject of the King of Italy, and resident of Turin, Italy, have invented certain new and useful Improvements in Apparatus for Concentrating Solutions, of which the following is a specification.

The present invention has for its object some improvements in the apparatus described in my U. S. Patent No. 973290 dated October 18, 1910, also in my Patents 761387, 893006, 719616, 925820, 940644, 955659 for operating the above said concentration by freezing, displacing the insoluble substances contained in the ice crystals and evaporating in the vacuum the water left in the mass, for the purpose of concentrating the solutions quickly and economically to such a degree that they may be, according to their nature, either directly disposed of (grape juice concentrated to the consistency of honey and partially crystallized, concentrated must, fruit juice, vegetable extracts, etc.,) or submitted to the last usual operation of crystallization of the sugar (cane sugar, beetroot sugar, crystallizable salts such as carbonate or sulfate of soda, or the like). The apparatus described in my prior patents and consisting of tanks, coils, straight tubes, etc., are however expensive to construct, require large interchanging surfaces and afford moreover but a limited efficiency as while the thickness of the ice layer on said surfaces increases, the number of frigories transmitted through the same diminishes.

The apparatus forming the principal object of this invention avoids said disadvantages, one of its features being that the interchanging surfaces on which the freezing is effected are caused to revolve and the frozen solution sticking thereto is removed in a continuous way by means of scrapers. A similar apparatus had already been proposed to avoid the above mentioned inconveniences, which occur also in the ice works; but it could not be adopted owing to the great consumption of motive power required for removing the firm ice from the surfaces to which it adheres and owing also to the fact that the ice thus removed in the state of snow from the said revolving surfaces, though strongly compressed, was opaque, of little consistency and difficult to keep. On the contrary, the use of revolving freezing surfaces for alcoholic or sugary solutions, etc., does not show any of the disadvantages above said, as the frozen mass has the consistency of a sherbet (for solutions diluted from 10 to 25%) or of an ice cream (for solutions more concentrated, from 25 to 50%) and can be easily removed. Moreover the frozen mass removed from the revolving surfaces by the scrapers and brought into the displacing tanks for the separation of the more concentrated solutions (according to the process described in my prior Patent No. 761387) is in the best conditions for a rapid and complete thawing of the interposed solution. By means of said rotating surfaces it is possible to obtain an output from 80 to 100 kg. of frozen solution for each $m^2$ of surface in an hour.

In the annexed drawing, I have shown by way of example, a constructional form of the present freezing apparatus with revolving surfaces connected with series of displacing tanks.

Figures 1 and 2 are vertical sections in side and front view respectively of my said apparatus. Fig. 3 is a diagrammatic plan view of a complete plant for the concentration of sugary solutions coming from the diffusers, by means of a series of the present freezing apparatus and a series of evaporators for boiling in the vacuum, which I heat by means of the water coming out at the temperature of about 25° C. from the condenser of the refrigerating machine and further heated up to about 40–70° C., by causing it to pass through the jacket of a gas or oil engine or through the condenser of a steam engine, also in counter current of the hot gas waste pipes or chimneys.

The sugary solution leaving the diffusers —1— passes into the interchanger —2— in which the solution coming from the cooled tanks in which the refrigerated juice is allowed to set, circulates in countercurrent and thereafter in the second interchanger —3— in which water at the ordinary temperature circulates and finally into the refrigerator —4— in which the solution is brought to a temperature very near its freezing point.

From the refrigerator the solution is conducted into the reservoir —5— having thermically insulated walls, in which the drums —6— revolve, these latter being horizontally disposed (preferably in number of two and rotating in contrary or opposed directions). In the interior of the drums —6— a refrigerating fluid is caused to circulate, which may be ammonia or any substance having at the ordinary temperature a pressure of vapor above the atmospheric tension (for instance methyl ether or methyl chlorid) and which does not bite the surface of the cylinders.

In order to attain the greatest possible efficiency the cylinder walls must be very thin; it is therefore convenient to make them of a special steel; moreover their surface may be smooth or undulated, as illustrated in the drawing, in order to increase the transmitting surface. Instead of only one reservoir —5— having freezing cylinders —6— it is convenient to employ two, three or more reservoirs, so that the solution, which has become frozen in the first reservoir and separated more concentrated in the underlying displacing tanks, is conveyed into the second reservoir to become again frozen and so on.

The ammonia will be caused to expand successively in the cylinders of the several reservoirs —5— at a lower and lower pressure in order to keep the difference of temperature between the evaporating ammonia and the freezing temperature of the solution becoming more and more concentrated in the successive reservoirs —5— nearly constant. The cylinders —6— are caused to revolve in opposite directions (as indicated by the arrows, Fig. 1) and the frozen solution sticking to them is removed therefrom in a continuous way by the two scrapers —7—, which are disposed inclined in opposite direction between the cylinders, each of them having moreover a double inclination toward their center (Fig. 2). At the central point common to both scrapers is provided a hole from which a waste or discharging pipe —8— conveys the frozen solution (removed by the scrapers and sinking by gravitation along the inclined surfaces thereof) into the displacing tanks —9—.

Underneath each reservoir —5— I dispose a series of displacing tanks (preferably in number of four), the tube —8— having a rubber end, so that it will be possible to cause the frozen solution to fall successively into the first, second, third and fourth tank —9— to return to the first one, from which meanwhile the concentrated solution has been displaced and the ice removed, and so on. Each displacing tank —9— is provided, near its bottom, with a grate —10— on which I place a layer of coarse sand or the like —11— through which the more concentrated solution will pass as it becomes separated from the ice. The pump —12— (Fig. 1) serves to raise this last solution and conduct it into the next reservoir —5— into which dip freezing drums and so on. The solution separated in the tanks —9— is at first much more concentrated than it will be afterward, therefore it is convenient to conduct during each operation in the next reservoir —5— only the more concentrated solution, the more and more diluted solutions dripping afterward from the tanks —9— are conveyed into a series of small by-reservoirs —13— where they are kept at a low temperature and used to irrigate the ice crystals separated from the solution in the next series of tanks —9— in order to effect a systematic displacement of the solution still contained in said crystals.

The more concentrated solution dripping from the last displacing tank —9— contains about 45% to 50% crystallizable of sugar and its volume is reduced to about ¼ of the original volume of the solution. Said solution passes in the tank —14-A— where it is again defecated, and then it is decanted or filtered in filter —15— and conducted into the first interchanger —2— where it is again heated. From the interchanger —2— the solution passes into the tank —16—, in which the juice is saturated with lime, through the pipe —17—, in the carbonation tank —18— and through the filter —19— into the vacuum concentrating apparatus —20—. The reservoirs —5—, having revolving drums —6—, in the example shown for the preparation of beetroot sugar, are arranged directly after the diffusers —1—, so that the operations of neutralization and carbonatation may be effected on a concentrated solution of about ¼ its former volume, thus obtaining a considerable economy; said reservoirs however could also be placed after the neutralization and carbonatation tanks; moreover said tanks having revolving drums can also be used for freezing any other solution without departing from the principle of this invention. The melting water of the ice separated in the displacing tanks —9— may be conveniently used for a further refrigeration of the gas of the refrigerating machine by using a supplementary condenser; the water thus heated may then be used to exhaust a new quantity of material after filtration.

The vacuum concentrating apparatus —20— are heated by means of the water passing through the condenser of the refrigerating machine and then, as already said, in the engine jacket, in the steam condenser and in counter current of the hot gas waste pipes or chimneys. The temperature of said water will gradually sink and, if very high degree of vacuum be obtained, the temperature of the water leaving the last concentrator may descend even as low as 15° C. and be used again as refrigerating water in the condensers. The condensers of said concentrators are refrigerated by means of water at a temperature sinking as far as 0° C.; it is thus possible to use in succession the same water for the evaporation of the solution, the condensation of the gas in the condenser of the refrigerating machine, the cooling of the gas or oil engine (or the steam condensation of the steam engine) and then again for the concentration of the solution and so on, thus effecting a closed cycle of great thermic efficiency and very convenient for the countries where or seasons where one cannot obtain a sufficient quantity of water.

In the expression "solutions" used in the claims are intended to be included vegetable, animal and mineral solutions such as musts, wines, liquors, brines, etc.

What I claim is:

1. In an apparatus for concentrating a solution of the character described, a thermically insulated reservoir for said solutions, a pair of hollow cylinders adapted to contain a refrigerant and partially submerged in said reservoir and revolving in opposite directions, said refrigerant adapted to maintain a constant difference between the temperature of said fluid and the freezing temperature of said solution, a V-shaped trough situated in the space between said drums and with its ends higher than its middle, the sides of said trough forming scrapers for removing the frozen solution adhering to the drums, tanks for receiving the frozen solution and pipe connection from the lower part of said trough to said tanks.

2. In an apparatus for concentrating a solution of the character described, a thermically insulated reservoir for said solution, a pair of hollow cylinders adapted to contain a refrigerant and partially submerged in said reservoir and revolving in opposite directions, said refrigerant adapted to maintain a constant difference between the temperature of said fluid and the freezing temperature of said solution, a V-shaped trough situated in the space between said drums and with its ends higher than its middle, the sides of said trough forming scrapers for removing the frozen solution adhering to the drums, tanks for receiving the frozen solution and pipe connection from the lower part of said trough to said tanks; said tanks being provided with a grate near the bottom for a layer of gravel and a pump for drawing off the concentrated solution which has passed through the grate.

3. In an apparatus for concentrating a solution of the character described, a series of thermically insulated reservoirs for said solution, a pair of hollow cylinders adapted to contain a refrigerant and partially submerged in each of said reservoirs and revolving in opposite directions, said refrigerant adapted to maintain a constant difference between the temperature of said fluid and the freezing temperature of said solution, a V-shaped trough situated in the space between said drums and with its ends higher than its middle, the sides of said trough forming scrapers for removing the frozen solution adhering to the drums, a set of tanks for each reservoir for receiving the frozen solution and pipe connection from the lower part of said trough to said tanks.

4. In an apparatus for concentrating a solution of the character described, a series of thermically insulated reservoirs for said solution, a pair of hollow cylinders adapted to contain a refrigerant and partially submerged in each of said reservoirs and revolving in opposite directions, said refrigerant adapted to maintain a constant difference between the temperature of said fluid and the freezing temperature of said solution, a V-shaped trough situated in the space between said drums and with its ends higher than its middle, the sides of said trough forming scrapers for removing the frozen solution adhering to the drums, a set of tanks for each reservoir for receiving the frozen solution and pipe connection from the lower part of said trough to said tanks; said tanks being provided with a grate near the bottom for a layer of gravel and a pump for drawing off the concentrated solution which has passed through the grate; the pumps in the previous set of tanks constructed to deposit said concentrated solution in the next reservoir in the series.

5. In an apparatus for concentrating a solution of the character described, a thermically insulated reservoir for said solution, a pair of hollow cylinders adapted to contain a refrigerant and with corrugated sides partially submerged in said reservoir and revolving in opposite directions, said refrigerant adapted to maintain a constant difference between the temperature of said fluid and the freezing temperature of said solution, a V-shaped trough situated in the space between said drums and with its ends higher than its middle, the sides of said trough forming scrapers for removing the frozen solution adhering to the drums, tanks for receiving the frozen solution and pipe connection from the lower part of said trough for selectively connecting the trough with any one of the tanks.

The foregoing specification signed at Turin, Kingdom of Italy, this sixth day of August, 1912.

EUDO MONTI.

In presence of—
 JOCELYNE SOUBEYRON,
 LUG FERRUCCIS FREVOHACCI.